(12) United States Patent
Ishimori et al.

(10) Patent No.: US 6,588,299 B2
(45) Date of Patent: Jul. 8, 2003

(54) TRANSMISSION FOR A WORKING VEHICLE

(75) Inventors: Shoso Ishimori, Sakai (JP); Takeshi Komorida, Sakai (JP); Nobuyuki Yamashita, Izumi (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 09/925,839

(22) Filed: Aug. 8, 2001

(65) Prior Publication Data

US 2002/0083793 A1 Jul. 4, 2002

(30) Foreign Application Priority Data

Sep. 5, 2000 (JP) ......................................... 2000-268317

(51) Int. Cl.[7] .............................................. B60K 17/04
(52) U.S. Cl. ..................... 74/665 L; 74/720; 74/665 M
(58) Field of Search ............................. 74/720, 665 L, 74/665 M, 15.6, 15.63, 606 R

(56) References Cited

U.S. PATENT DOCUMENTS

| 3,713,494 | A | * | 1/1973 | Berdrin | ................... 74/665 M |
| 4,880,070 | A | * | 11/1989 | Irikura | ....................... 180/53.1 |
| 4,974,472 | A | * | 12/1990 | Nishimura et al. | ............ 74/720 |
| 5,081,365 | A | * | 1/1992 | Field et al. | ..................... 290/45 |
| 5,228,366 | A | * | 7/1993 | Thoma et al. | ............ 74/606 R |
| 6,251,042 | B1 | * | 6/2001 | Peterson et al. | ................ 477/3 |
| 6,397,966 | B1 | * | 6/2002 | Irikura et al. | ................ 180/307 |

* cited by examiner

*Primary Examiner*—Sherry Estremsky
(74) *Attorney, Agent, or Firm*—Orkin, Byrne and Shideler

(57) ABSTRACT

A transmission for a working vehicle comprising a transmission mechanism for controlling drive transmission; a first input shaft for transmitting drive from an engine to the transmission mechanism; a second input shaft, usable as an alternative to the first input shaft, for transmitting drive from the engine to the transmission mechanism, the second input shaft extending in a different direction to the first input shaft; an implement-operating output shaft for outputting drive from the transmission mechanism to drive a working implement; and a pair of right and left propelling output shafts for transmitting drive from the transmission mechanism to drive wheels, the propelling output shafts extending in the same direction as axes of the drive wheels. The first and second input shafts extend transversely of the propelling output shafts. The implement-operating output shaft extends in the same direction as the first input shaft.

11 Claims, 7 Drawing Sheets

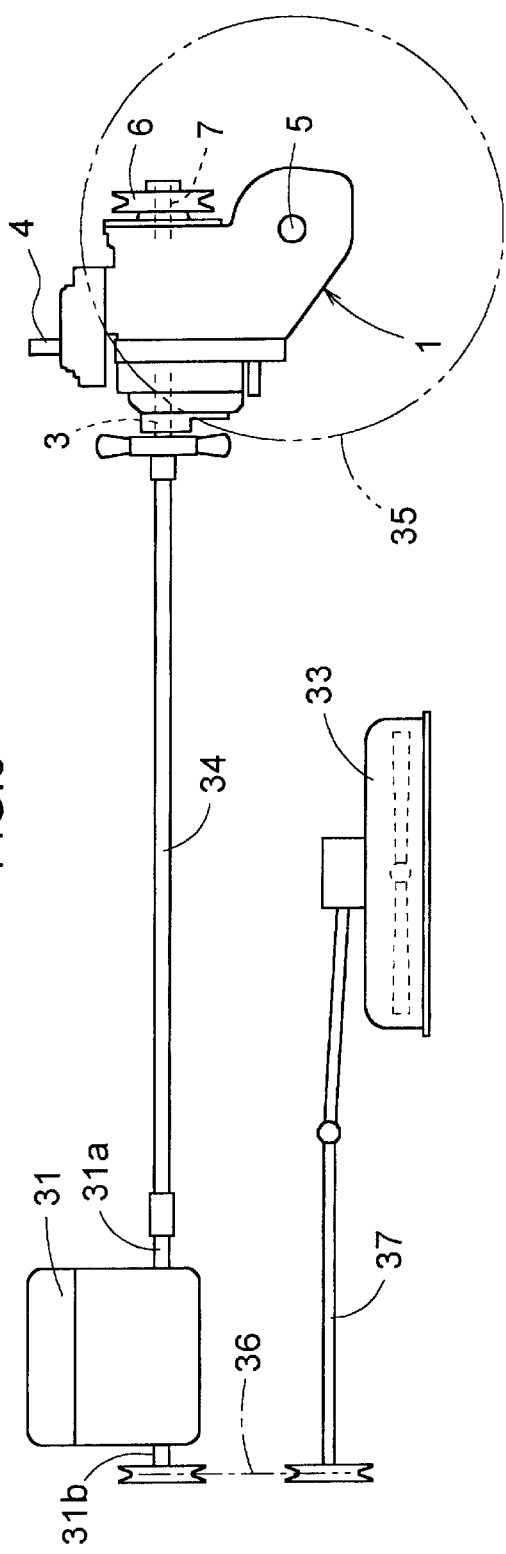
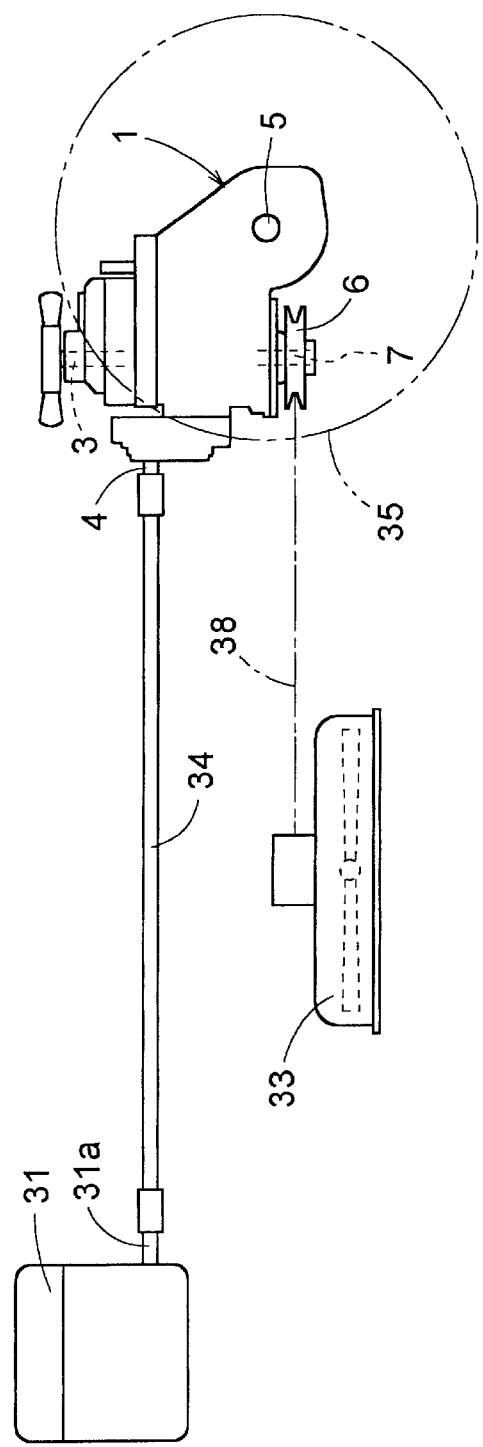

US 6,588,299 B2

TRANSMISSION FOR A WORKING VEHICLE

BACKGROUND OF THE INVENTION

1. Field of the Invention

This invention relates to a transmission for a working vehicle, having a transmission mechanism for transmitting drive from an engine to drive wheels and to a working implement attached to the working vehicle.

2. Description of the Related Art

A working vehicle with a working implement such as a mower unit attached thereto may employ a horizontal engine with an engine output shaft extending horizontally or a vertical engine with an engine output shaft extending vertically. One of the two types of engine is selected according to the specifications of the working vehicle.

Where the horizontal engine is employed, the vehicle may have a transmission with an input shaft extending longitudinally of the vehicle body for transmitting engine drive to the transmission mechanism. Engine drive may be transmitted to the transmission mechanism simply by connecting the input shaft of the transmission to the engine output shaft through an intermediate shaft. On the other hand, where the vertical engine is employed, the vehicle may have a transmission with an input shaft extending in the same direction as the engine output shaft for transmitting engine drive to the transmission mechanism. In this case, engine drive may be transmitted to the transmission mechanism simply by connecting the input shaft of the transmission to the engine output shaft through a transmission belt.

Conventionally, therefore, both the former transmission for the horizontal engine and the latter transmission for the vertical engine are made available and used separately as appropriate. However, keeping two such transmissions of different constructions in stock is a factor to increase manufacturing cost.

SUMMARY OF THE INVENTION

The object of this invention is to provide a dual-purpose transmission for a working vehicle, which may be used with both a vertical engine and a horizontal engine.

The above object is fulfilled, according to this invention, by a transmission for a working vehicle comprising a transmission mechanism for controlling drive transmission; a first input shaft for transmitting drive from an engine to the transmission mechanism; a second input shaft, usable as an alternative to the first input shaft, for transmitting drive from the engine to the transmission mechanism, the second input shaft extending in a different direction to the first input shaft; an implement-operating output shaft for outputting drive from the transmission mechanism to drive a working implement; and a pair of right and left propelling output shafts for transmitting drive from the transmission mechanism to drive wheels, the propelling output shafts extending in the same direction as axes of the drive wheels.

With this construction, where a horizontal engine is employed as onboard engine, for example, the transmission is installed with the first input shaft extending in the fore and aft direction or longitudinally of the vehicle body, or with the second input shaft extending in the fore and aft direction or longitudinally of the vehicle body. Then, drive from the engine may be inputted to the transmission mechanism only by connecting the engine output shaft to the first input shaft or second input shaft through an intermediate transmission shaft.

Where a vertical engine is employed as onboard engine, the transmission is installed with the first input shaft extending vertically of the vehicle body, or the second input shaft extending vertically of the vehicle body. Then, drive from the engine may be inputted to the transmission mechanism only by connecting the engine output shaft to the first input shaft or second input shaft through a transmission belt.

The first input shaft or second input shaft may be selected as input device for the transmission mechanism by taking the balance of the transmission and posture of the implement-operating output shaft into account. Thus, whichever of the horizontal engine and vertical engine is employed, engine drive may be inputted to the transmission mechanism by means of a simple relay mechanism using an intermediate shaft or transmission belt. In selecting whichever of the input shafts, the ultimate posture of the implement-operating output shaft may also be considered. Drive may be transmitted smoothly to a working implement whether the implement is disposed at a side of the transmission case close to the engine or at the opposite side.

As a preferred embodiment of this invention, it is proposed that the first input shaft and the second input shaft extend transversely of the propelling output shafts, and that the implement-operating output shaft extends in the same direction as the first input shaft. With this construction, when the transmission is placed with the first input shaft or second input shaft extending horizontally or vertically, the propelling output shafts always extend transversely of the vehicle body. Thus, a high degree of freedom is secured for selecting one of the input shafts.

In a further preferred embodiment of this invention, the first input shaft and the implement-operating output shaft may be interconnected through a coupling, and the first input shaft or the implement-operating output shaft and the second input shaft may be interconnected through a bevel gear mechanism. Then, whichever of the first input shaft and second input shaft the engine drive may be inputted to, the drive is outputted straight to the implement-operating output shaft.

When the first input shaft is used to transmit engine drive to the transmission mechanism, the second input shaft made redundant may be detached. This avoids the inconvenience of the unwanted component projecting from the transmission.

Take a mower as an example of working vehicle, varied constructions are employed such as where an engine is disposed at the front or rear of the vehicle body, or where a mower unit is disposed at the front of the vehicle body or in an intermediate portion of the vehicle body. For a working vehicle with the engine position and working implement position frequently changed according to the specifications, the freedom of positioning of the transmission according to this invention is particularly important.

Other features and advantages of this invention will be apparent from the following description of the embodiment to be taken with reference to the drawings.

BRIEF DESCRIPTION OF THE DRAWINGS

FIG. 6 is an explanatory view showing an example of use of the transmission;

FIG. 7 is an explanatory view showing another example of use of the transmission;

DESCRIPTION OF THE PREFERRED EMBODIMENT

Figure 1:
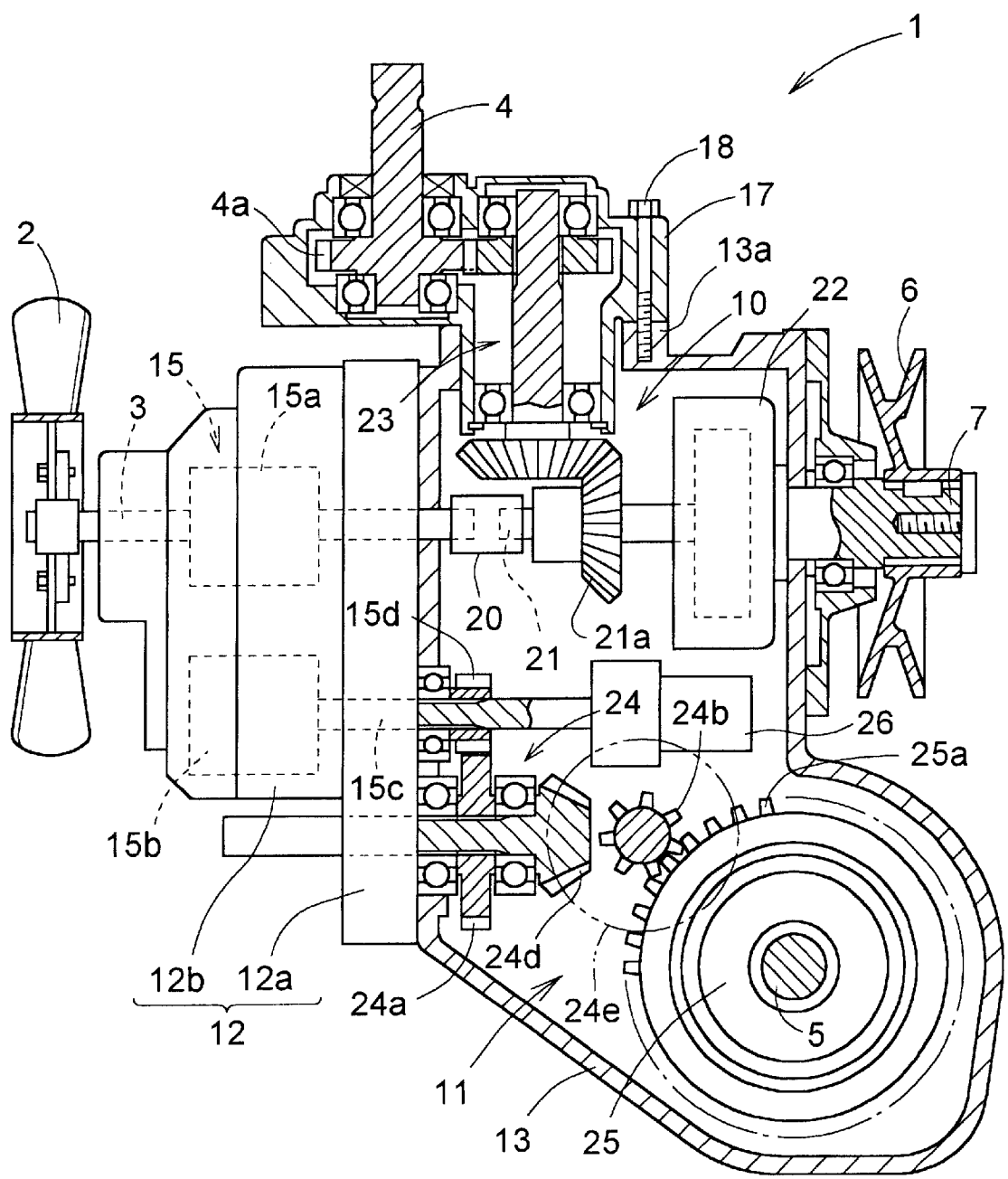
FIG. 1 is a side view in vertical section of a transmission.
Figure 2:
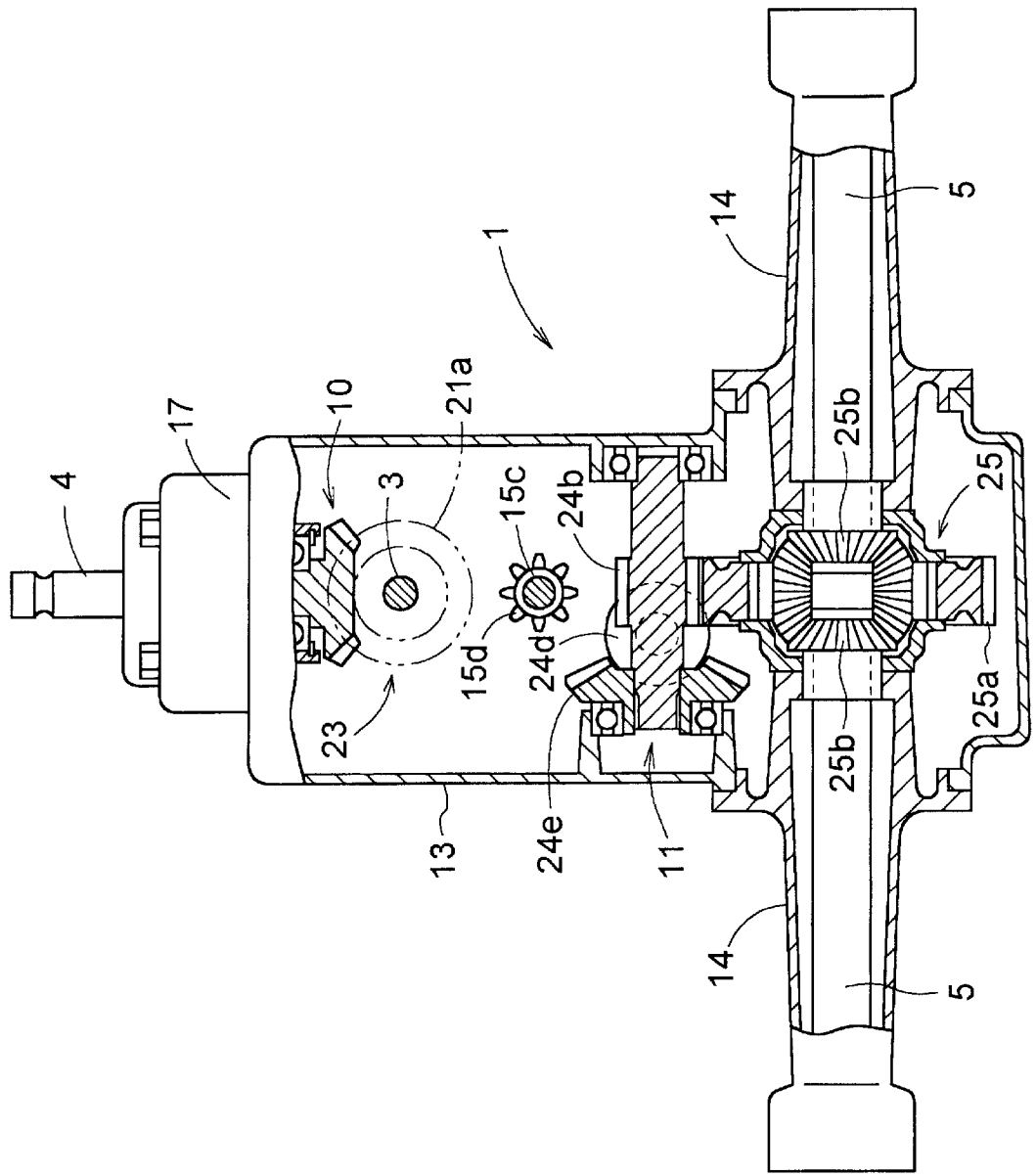
FIG. 2 is a rear view in vertical section of the transmission.

FIGS. 1 and 2 show a transmission according to this invention. This transmission, except projecting shaft portions, is enclosed in a transmission case 1 acting as a housing. FIG. 1 shows the transmission in a posture seen laterally of a working vehicle on which the transmission is mounted. Thus, FIG. 1 is regarded herein as a side view of the transmission. As seen from FIG. 1, a first input shaft 3 projects forwardly of a front wall of transmission case 1 for receiving engine drive (the front wall being so called since it is disposed forwardly with respect to a traveling direction when the transmission is mounted on the working vehicle). A cooling fan 2 is attached to a projecting end of the first input shaft 3 to be rotatable therewith. A second input shaft 4 projects from an upper wall of transmission case 1 similarly for receiving engine drive. The second input shaft 4 extends perpendicular to the first input shaft 3 in FIG. 1 (that is, the first input shaft 3 extends horizontally, and the second input shaft 4 vertically). An implement-operating output shaft 7 projects rearward from a rear wall of transmission case 1. A power takeoff pulley 6 is mounted on a projecting end of the implement-operating output shaft 7 to be rotatable therewith. Further, a pair of right and left propelling output shafts 5 are arranged in a rearward region of transmission case 1. As seen from FIG. 2, these output shafts 5 extend transversely of (e.g. at right angles to) the first input shaft 3 and second input shaft 4.

Figure 8:
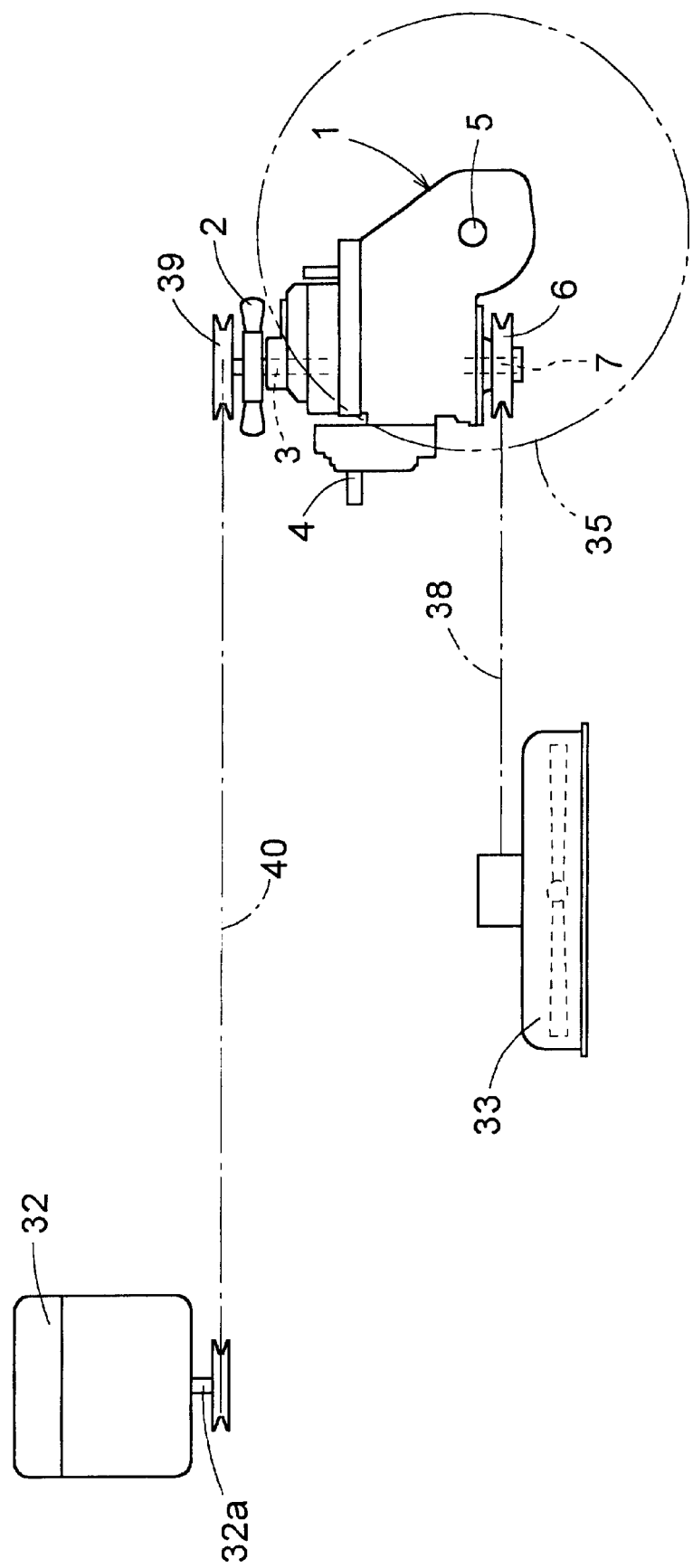
FIG. 8 is an explanatory view showing a further example of use of the transmission.

The transmission case 1 houses transmission mechanisms for outputting inputted drive at appropriate speeds. These mechanisms are an implement-operating transmission mechanism 10 for transmitting drive from the first input shaft 3 or the second input shaft 4 to the implement-operating output shaft 7, and a propelling transmission mechanism 11 for transmitting drive from the first or second input shaft 3 or 4 to the pair of propelling output shafts 5. This transmission may be used chiefly on two types of vehicles as shown in FIGS. 6 through 8. One type has a horizontal engine 31 with an output shaft 31a extending longitudinally of the vehicle body. The other type has a vertical engine 32 with an output shaft 32a extending vertically of the vehicle body. Either type of working vehicle may have a mower unit 33 disposed between front and rear wheels of the vehicle body to act as a riding lawn mower.

As shown in FIGS. 1 and 2, the transmission case 1 is composed of a change speed casing 12, a main transmission case body 13 having a front end thereof coupled to a rear end of an oil passage forming block 12a of the change speed casing 12, an input case 17 having a lower end thereof coupled to an upper end of the main transmission case body 13, a propelling output case 14 having a proximal end thereof coupled to opposite sides at a lower end of the main transmission case body 13. The change speed casing 12 is composed of a main change speed casing body 12b having a plunger type variable displacement hydraulic pump 15a and a plunger type hydraulic motor 15b mounted therein, and the oil passage forming block 12a having a front end thereof coupled to a rear end of the main change speed casing body 12b and defining therein driving oil passages extending between inputs and outputs of the hydraulic pump 15a and hydraulic motor 15b. In FIG. 1, the first input shaft 3 acts as an input shaft of hydraulic pump 15a.

The second input shaft 4 is supported by the input case 17. The input case 17 is detachably attached to a mounting seat 13a of the main transmission case body 13 by connecting bolts 18. Thus, by detaching the input case 17, the second input shaft 4 may be detached. After the second input shaft 4 is detached, a blank cover 19 is attached to the mounting seat 13a to close an input opening of the main transmission case body 13.

The implement-operating output shaft 7 is rotatably attached to the main transmission case body 13 in coaxial alignment with the first input shaft 3. The pair of propelling output shafts 5 are rotatably attached to the propelling output case 14, with drive wheels connected directly or indirectly to distal ends thereof. Though not shown, each propelling output shaft 5 extends in the same direction as the axis of the drive wheel associated therewith.

As shown in FIG. 1, the implement-operating transmission mechanism 10 includes a transmission shaft 21 having one end thereof connected by a coupling 20 to an end of first input shaft 3 disposed in the main transmission case body 13 to be rotatable together, a hydraulically operable implement-operating clutch 22 having an input end thereof connected to the other end of transmission shaft 21, and an output end connected to an end of implement-operating output shaft 7 disposed in the main transmission case body 13, and a gear type transmission mechanism 23 supported in the input case 17 for interlocking an input shaft gear 4a mounted on and rotatable with an end of second input shaft 4 disposed in the input case 17 to a transmission shaft gear 21a mounted on and rotatable with the transmission shaft 21. Thus, the drive of the first input shaft 3 is transmitted to the implement-operating output shaft 7 through the coupling 20, transmission shaft 21 and implement-operating clutch 22. The drive of the second input shaft 4 is transmitted to the implement-operating output shaft 7 through the input shaft gear 4a, an intermediate transmission shaft 23 having a gear meshed with the input shaft gear 4a, a bevel gear mechanism 21a operatively connecting the intermediate transmission shaft 23 to the transmission shaft 21, and through the transmission shaft 21 and implement-operating clutch 22. Whether transmitted from the first input shaft 3 or from the second input shaft 4, the drive is connected and disconnected by engagement and disengagement of the implement-operating clutch 22.

As shown in FIGS. 1 and 2, the propelling transmission mechanism 11 includes the gear type transmission mechanism 23, transmission shaft 21, a hydrostatic stepless propelling transmission device 15 having the hydraulic pump 15a and hydraulic motor 15b, a gear type transmission mechanism 24 having an input gear 24a meshed with an output shaft gear 15d mounted on and rotatable with an output shaft 15c of the hydraulic motor 15b of stepless propelling transmission device 15, and a differential mechanism 25 having a drive gear 25a meshed with an output gear 24b of gear type transmission mechanism 24 and a pair of output gears 25b splined, respectively, to ends of the propelling output shafts 5 to be rotatable therewith. Thus, the drive of the first input shaft 3 is transmitted directly, and the drive of the second input shaft 4 is transmitted through the gear type transmission mechanism 23, transmission shaft 21, coupling 20 and first input shaft 3, to the hydraulic pump 15a of stepless propelling transmission device 15. The stepless propelling transmission device 15 switches the drive between forward and backward, and steplessly changes speed in both forward and backward directions. The drive from the hydraulic motor 15b of stepless propelling transmission device 15 is transmitted to the differential mechanism 25 through the gear type transmission mechanism 24. The differential mechanism 25 transmits the drive to the left propelling output shaft 5 and right propelling output shaft 5.

Figure 3:
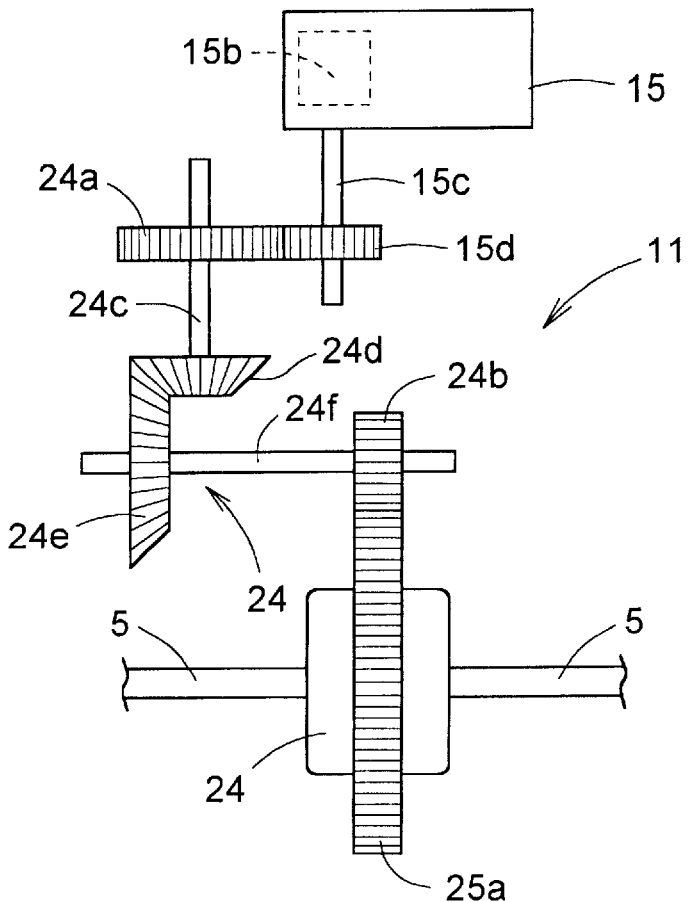
FIG. 3 is an explanatory view of a gear type transmission mechanism.

As shown in FIG. 3, for example, the gear type transmission mechanism 24 in the propelling transmission mechanism 11 includes the input gear 24a, a bevel gear 24d interlocked to the input gear 24a through a rotary shaft 24c, a bevel gear 24e meshed with the bevel gear 24d, and the output gear 24b interlocked to the bevel gear 24e through a rotary shaft 24f.

Numeral 26 in FIG. 1 denotes a parking brake for frictionally braking the output shaft 15c of the hydraulic motor 15b of stepless propelling transmission device 15, thereby to brake the right and left propelling output shafts 5.

Figure 4:
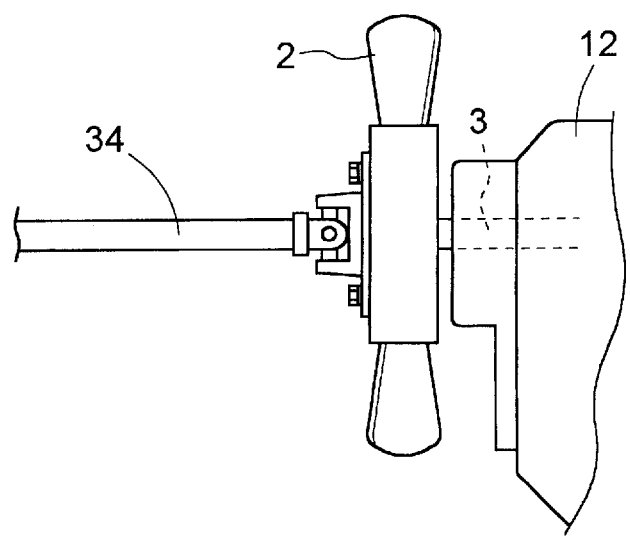
FIG. 4 is a side view of a connection between a first input shaft and an intermediate shaft.
Figure 9:
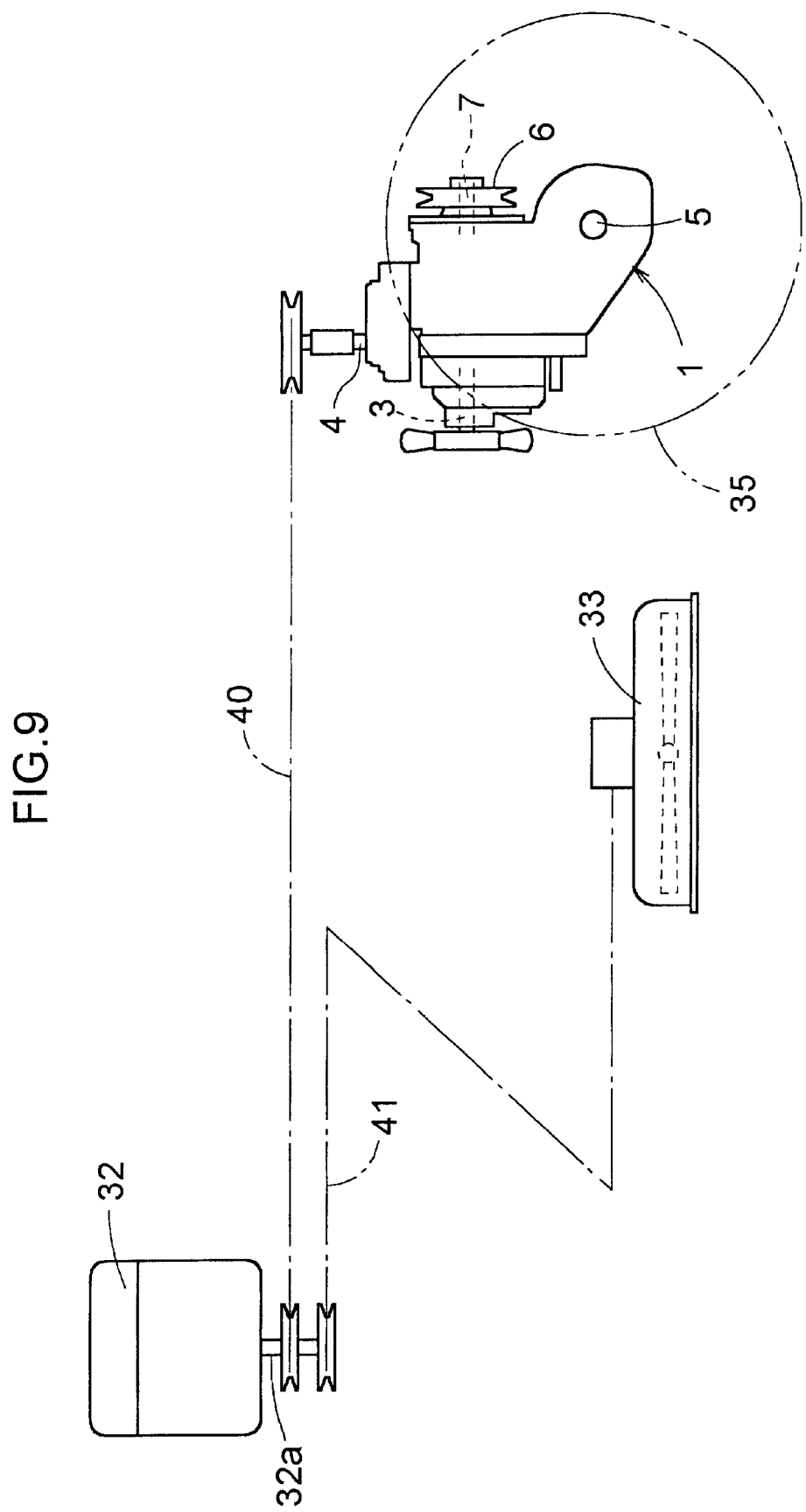
FIG. 9 is an explanatory view showing a still further example of use of the transmission.

Depending on the type of engine installed, i.e. whether a horizontal engine or a vertical engine, and depending on a layout of the drive transmission line to the mower unit 33, the transmission according to this invention may be mounted in a different posture on the vehicle body. Thus, a riding lawnmower may be constructed as shown in FIGS. 6 through 9.

Where the horizontal engine 31 is employed as shown in FIG. 6, for example, the transmission is mounted on a body frame rearwardly of the engine 31, with the first input shaft 3 extending longitudinally of the vehicle body toward the engine 31 and connected through a rotary shaft 34 to the output shaft 31a projecting rearward from the engine 31, and the right and left propelling output shafts 5 interlocked to the rear wheels 35. An output shaft 31b projecting forward from the engine 31 is interlocked to an input portion of mower unit 33 through a belt transmission mechanism 36 and a rotary shaft 37. In this case, as shown in FIG. 4, the first input shaft 3 is connected to the rotary shaft 34 through the cooling fan 2. Alternatively, where the horizontal engine 31 is employed, as shown in FIG. 7, the transmission may be mounted on the body frame rearwardly of the engine 31, with the second input shaft 4 extending longitudinally of the vehicle body toward the engine 31 and connected through the rotary shaft 34 to the output shaft 31a projecting rearward from the engine 31, and the right and left propelling output shafts 5 interlocked to the rear wheels 35. The implement-operating output shaft 7 is interlocked to the input portion of mower unit 33 through a transmission belt 38 wound around the power takeoff pulley 6.

Where the vertical engine is employed as shown in FIG. 8, the transmission is mounted on the body frame rearwardly of the engine 31, with the first input shaft 3 extending vertically of the vehicle body and connected to the output shaft 32a of engine 32 through a transmission belt 40 wound around an input pulley 39 attached to the first input shaft 3 through the cooling fan 2, and the right and left propelling output shafts 5, interlocked to the rear wheels 35. The implement-operating output shaft 7 is interlocked to the input portion of mower unit 33 through the transmission belt 38 wound around the power takeoff pulley 6. Alternatively, where the vertical engine is employed, as shown in FIG. 9, the transmission may be mounted on the body frame rearwardly of the engine 32, with the second input shaft 4 extending vertically of the vehicle body and interlocked to the output shaft 32a of engine 32 through the transmission belt 40, and the right and left propelling output shafts 5 interlocked to the rear wheels 35. The output shaft 32a of engine 32 is interlocked to the input portion of mower unit 33 through a transmission belt 41.

Figure 5:
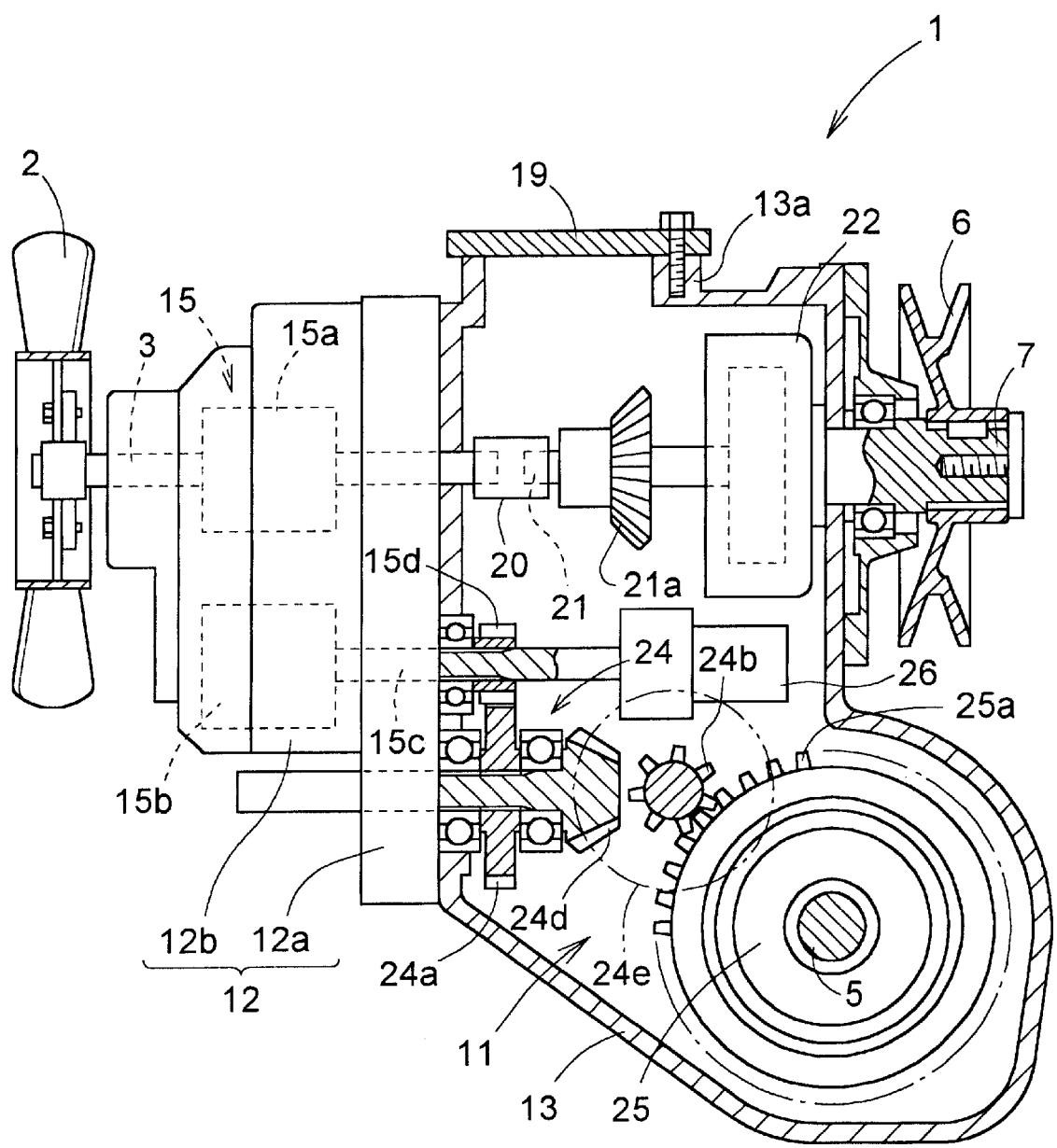
FIG. 5 is a side view of the transmission with a second input shaft detached therefrom.

The second input shaft 4, when out of use, may be detached as shown in FIG. 5. This renders the transmission case 1 neat and plain with a reduced number of projections.

This invention is applicable to a transmission for a dust collector or the like besides a riding lawn mower. These machines are collectively called a working vehicle herein.

What is claimed is:

1. A transmission for a working vehicle comprising:
   a transmission mechanism for controlling drive transmission;
   a transmission case substantially housing said transmission mechanism;
   a first input shaft for transmitting drive from an engine to said transmission mechanism;
   a second input shaft, usable as an alternative to said first input shaft, for transmitting drive from said engine to said transmission mechanism, said second input shaft extending in a different direction to said first input shaft, wherein said second input shaft is constantly and operatively connected with said first input shaft within said transmission case so that the drive of torque on said first input shaft can be transmitted to said second input shaft and that the drive of torque on said second input shaft can be transmitted to said first input shaft;
   an implement-operating output shaft for outputting drive from said transmission mechanism to drive a working implement; and
   a pair of right and left propelling output shafts for transmitting drive from said transmission mechanism to drive wheels, said propelling output shafts extending in the same direction as axes of said drive wheels.

2. A transmission as defined in claim 1, wherein said first input shaft and said second input shaft extend transversely of said propelling output shafts.

3. A transmission as defined in claim 1, wherein said implement-operating output shaft extends in the same direction as said first input shaft.

4. A transmission as defined in claim 3, wherein said first input shaft and said implement-operating output shaft are interconnected through a coupling, and said first input shaft or said implement-operating output shaft and said second input shaft are interconnected through a bevel gear mechanism.

5. A transmission as defined in claim 1, wherein said second input shaft may be detached when the said first input shaft is used to transmit drive from said engine to said transmission mechanism.

6. A transmission as defined in claim 1, wherein said first input shaft acts as a drive shaft for an HST of said transmission mechanism, a cooling fan for cooling said HST being attachable to said first input shaft.

7. A transmission as defined in claim 1, wherein said implement-operating output shaft is arranged to transmit drive to a mower unit acting as said working implement.

8. A transmission as defined in claim 1, wherein said second input shaft extends perpendicular to said first input shaft.

9. A transmission as defined in claim 1, wherein said transmission mechanism includes an implement-operating transmission mechanism and a propelling transmission mechanism each adapted to receive drive selectively from one of said first input shaft and said second input shaft, and wherein the drive received by said implement-operating transmission mechanism is outputted from said transmission case through said implement-operating output shaft, and the drive received by said propelling transmission mechanism is outputted from said transmission case through said pair of right and left propelling output shafts.

10. A transmission as defined in claim 1, wherein, when said engine is a horizontal engine having its output shaft extending longitudinally, one of said first input shaft and said second input shaft projects out of said transmission case toward said horizontal engine, to convey the drive from said engine output shaft to said transmission mechanism.

11. A transmission as defined in claim 1, wherein, when said engine is a vertical engine having its output shaft extending vertically, one of said first input shaft and said second input shaft projects vertically out of said transmission case, to convey the drive from said engine output shaft to said transmission mechanism.

* * * * *